(12) United States Patent
Lin et al.

(10) Patent No.: US 7,176,592 B2
(45) Date of Patent: Feb. 13, 2007

(54) STATOR STRUCTURE OF ROTARY DEVICE AND ITS FORMING METHOD

(75) Inventors: Kuo-Cheng Lin, Taoyuan Hsien (TW); Shou Te Yu, Taoyuan Hsien (TW); Yao Lung Huang, Taoyuan Hsien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 0 days.

(21) Appl. No.: 11/007,270

(22) Filed: Dec. 9, 2004

(65) Prior Publication Data

US 2005/0097723 A1    May 12, 2005

Related U.S. Application Data

(62) Division of application No. 09/931,239, filed on Aug. 17, 2001, now Pat. No. 6,853,101.

(30) Foreign Application Priority Data

Sep. 29, 2000    (TW) .............................. 89120144 A

(51) Int. Cl.
*H02K 15/02* (2006.01)
*H02K 1/12* (2006.01)
*H02K 37/00* (2006.01)

(52) U.S. Cl. ...................... 310/42; 310/49 R; 310/254; 310/164; 29/596

(58) Field of Classification Search ............. 310/49 R, 310/216, 218, 194, 254, 257, 42, 164; 29/596
See application file for complete search history.

(56) References Cited

U.S. PATENT DOCUMENTS 2,672,564 A    3/1954   Krasno

| | | |
|---|---|---|
| 2,981,858 A | 4/1961 | Riggs et al. |
| 3,495,113 A | 2/1970 | Haydon |
| 4,012,652 A | 3/1977 | Gilbert |
| 4,400,226 A | 8/1983 | Horrigan |

(Continued)

FOREIGN PATENT DOCUMENTS

JP    60023912 A  *  2/1985

*Primary Examiner*—Darren Schuberg
*Assistant Examiner*—David W. Scheuermann
(74) *Attorney, Agent, or Firm*—Birch, Stewart, Kolasch and Birch, LLP

(57) ABSTRACT

Disclosed is a stator structure of a rotary device and its forming method. The method for forming a stator structure includes the steps of (a) forming a first part having a first middle portion with a through hole, and M pieces of extending portions extending from the first middle portion, (b) forming a second part having a second middle portion with a through hole, and N pieces of extending portions extending from the second middle portion, (c) alternately bending the M pieces of extending portions of the first part toward a first direction and alternately bending the N pieces of extending portions of the second part toward a second direction opposite to the first direction, respectively, and (d) correspondingly combining the first and second parts together to form the stator structure in which the bent extending portions of the first and second parts constitute an enclosed columnar portion of the stator structure for winding a coil thereon, and (e) winding a coil around the enclosed columnar portion, wherein M and N are even numbers not less than four, respectively.

11 Claims, 11 Drawing Sheets

U.S. PATENT DOCUMENTS

| | | |
|---|---|---|
| 5,539,263 A | 7/1996 | Lee |
| 5,859,487 A | 1/1999 | Chen |
| 5,898,252 A | 4/1999 | Tanaka et al. |
| 5,945,765 A | 8/1999 | Chen |
| 6,441,531 B1 | 8/2002 | Horng et al. |
| 6,538,357 B2 | 3/2003 | Horng et al. |
| 6,853,101 B2 * | 2/2005 | Lin et al. .................. 310/49 R |

* cited by examiner

STATOR STRUCTURE OF ROTARY DEVICE AND ITS FORMING METHOD

This application is a division of prior U.S. patent application Ser. No. 09/931,239 filed Aug. 17, 2001 now U.S. Pat. No. 6,853,101.

FIELD OF THE INVENTION

The present invention is related to a stator structure of a rotary device and its forming method, and particularly to a stator structure of a motor and its forming method.

BACKGROUND OF THE INVENTION

Please refer to FIG. 1A showing a conventional motor fan 1 which includes a stator 11, a rotor including a ring-type magnet 12 and a hub 14 having a plurality of blades circumferentially fixed on its surface, a printed circuit board 13, and a fan guard 15. The stator 11 is formed by disposing a silicon steel sheet 111 with a specific shape in the mold to be sheathed with an insulator 112 (that is, a potting process) for fabricating a bobbin on which a coil 113 is wound, as shown in FIGS. 1A ~1C.

However, the surface of the silicon steel sheet 111 will be easily damaged due to high temperature during the potting process and the silicon steel sheet 111 will be easily covered with rust.

SUMMARY OF THE INVENTION

An object of the present invention is to provide a stator structure of a rotary device and its forming method.

According to the present invention, the method for forming a stator structure includes the steps of (a) forming a first part having a first middle portion with a through hole, and M pieces of extending portions extending from the first middle portion, (b) forming a second part having a second middle portion with a through hole, and N pieces of extending portions extending from the second middle portion, (c) alternately bending the M pieces of extending portions of the first part toward a first direction and alternately bending the N pieces of extending portions of the second part toward a second direction opposite to the first direction, respectively, and (d) correspondingly combining the first and second parts together to form the stator structure in which the bent extending portions of the first and second parts constitute an enclosed columnar portion of the stator structure for winding a coil thereon, and (e) winding a coil around the enclosed columnar portion, wherein M and N are even numbers not less than four, respectively.

In accordance with one aspect of the invention, the first and second parts are integrally formed by a magnetically conductive material such as silicon steel, respectively.

Prefereably, each of the extending portions of the first and second parts is a rectangular sheet.

Preferably, each of the extending portions of the first and second parts is an arcuated sheet. The first middle portion of the first part is a ring which is connected with the each arcuated sheet of the first part through a narrowed connective portion, and the second middle portion of the second part is a ring which is connected with the each arcuated sheet of the second part through a narrowed connective portion.

After the step (d), the method further includes a step (ef) of coating the enclosed columnar portion of the stator structure with an insulating material. Preferably, the insulating material is an insulating tape. In addition, after the step (e), the method further includes a step (fg) of respectively bending residually unbent extending portions of the first and second parts toward the enclosed columnar portion for wrapping the coil in the stator structure.

Alternatively, the residually unbent extending portions of the first and second parts are arcuated sidewall structures such that the coil is wrapped in the stator structure by the arcuated sidewall structures of the first and second parts when the coil is wound on the columnar portion and the first and second parts are correspondingly combinated together. Preferably, the coil is a self-adhesive coil.

In accordance with another aspect of the invention, the stator structure includes a first part having a first middle portion with a through hole, and M pieces of extending portions extending from the first middle portion; a second part having a second middle portion with a through hole, and N pieces of extending portions extending from the second middle portion; wherein the M pieces of extending portions of the first part are alternately bent toward a first direction and the N pieces of extending portions of the second part are alternately bent toward a second direction opposite to the first directon, respectively, to constitute a columnar portion of the stator structure for winding a coil thereon when the first and second parts are correspondingly combined together, where M and N are even numbers not less than four, respectively.

In accordance with another yet aspect of the invention, the stator includes a first part having a first middle portion with a through hole, and M pieces of extending portions extending from the first middle portion; a second part having a second middle portion with a through hole, and N pieces of extending portions extending from the second middle portion; wherein the M pieces of extending portions of the first part are alternately bent toward a first direction and the N pieces of extending portions of the second part are alternately bent toward a second direction opposite to the first directon, respectively, to constitute a columnar portion of the stator when the first and second parts are correspondingly combined together, where M and N are even numbers not less than four, respectively; a coil wound around the columnar portion and wrapped in the first and second parts when the residually unbent extending portions of the first and second parts are bent toward the columnar portion; and an insulator sheathed on the columnar portion for prohibiting the contact of the coil with the columnar portion.

The present invention may best be understood through the following description with reference to the accompanying drawings, in which:

DETAILED DESCRIPTION OF THE PREFERRED EMBODIMENT

The present invention will now be described more detailedly with reference to the following embodiments. It is to be noted that the following descriptions of the preferred embodiments of this invention are presented herein for the purpose of illustration and description only. It is not intended to be exhaustive or to be limited to the precise form disclosed.

Figure 1A:
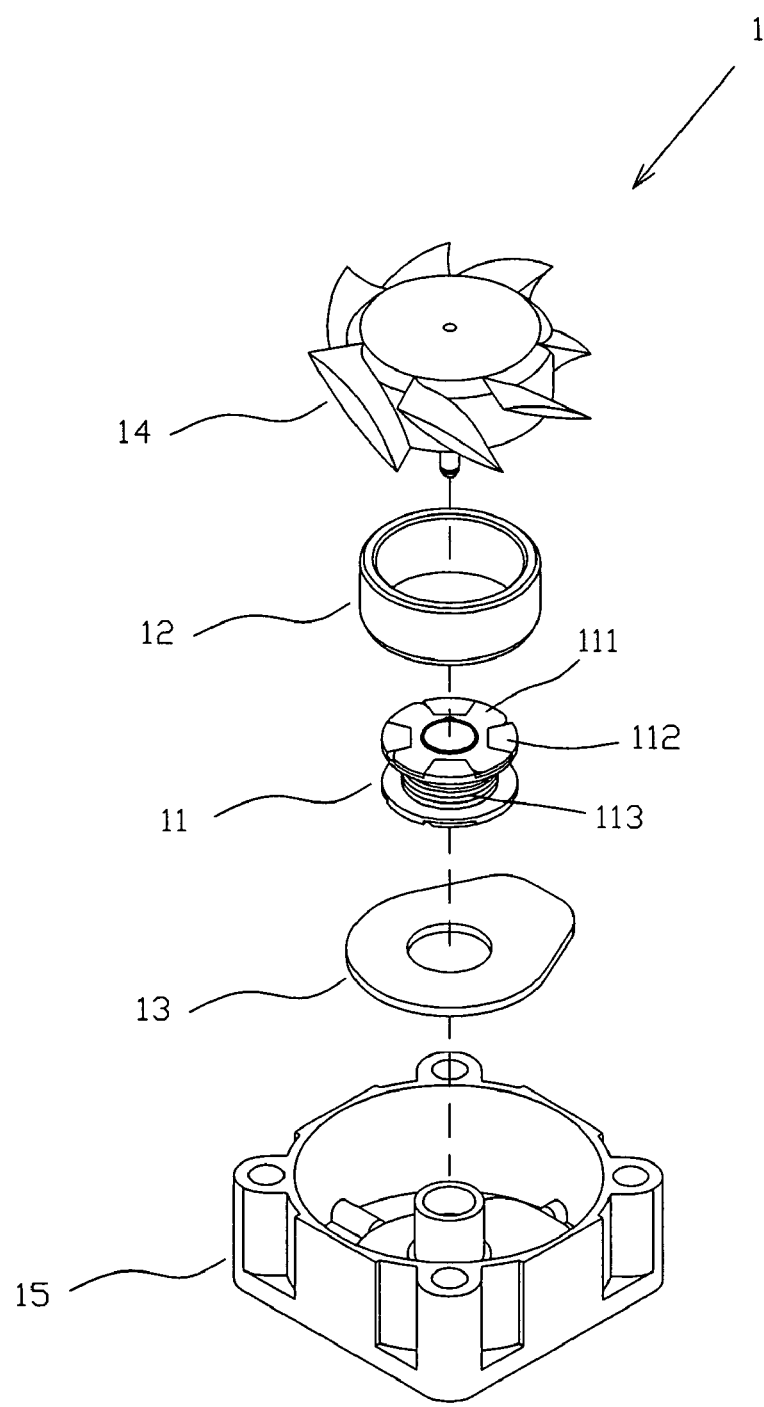
FIG. 1A is an exploded view of a conventional motor fan.
Figure 1B:
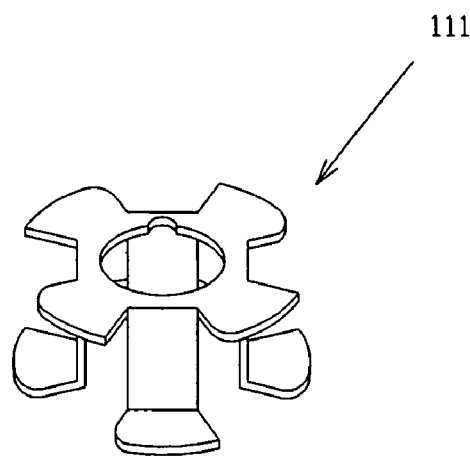
FIG. 1B shows the conventional silicon steel sheet used for forming a stator of the conventional motor fan shown in FIG. 1A.
Figure 1C:
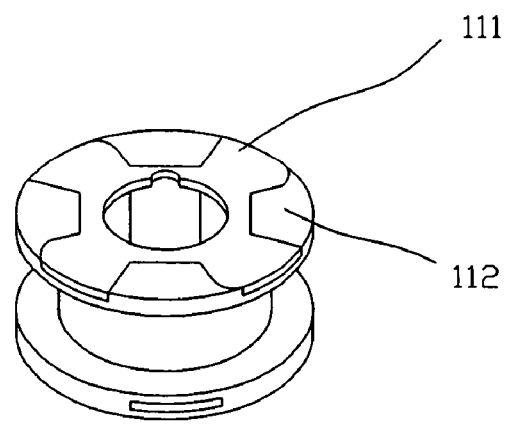
FIG. 1C shows the silicon steel sheet of FIG. 1B sheathed with an insulator.
Figure 2:
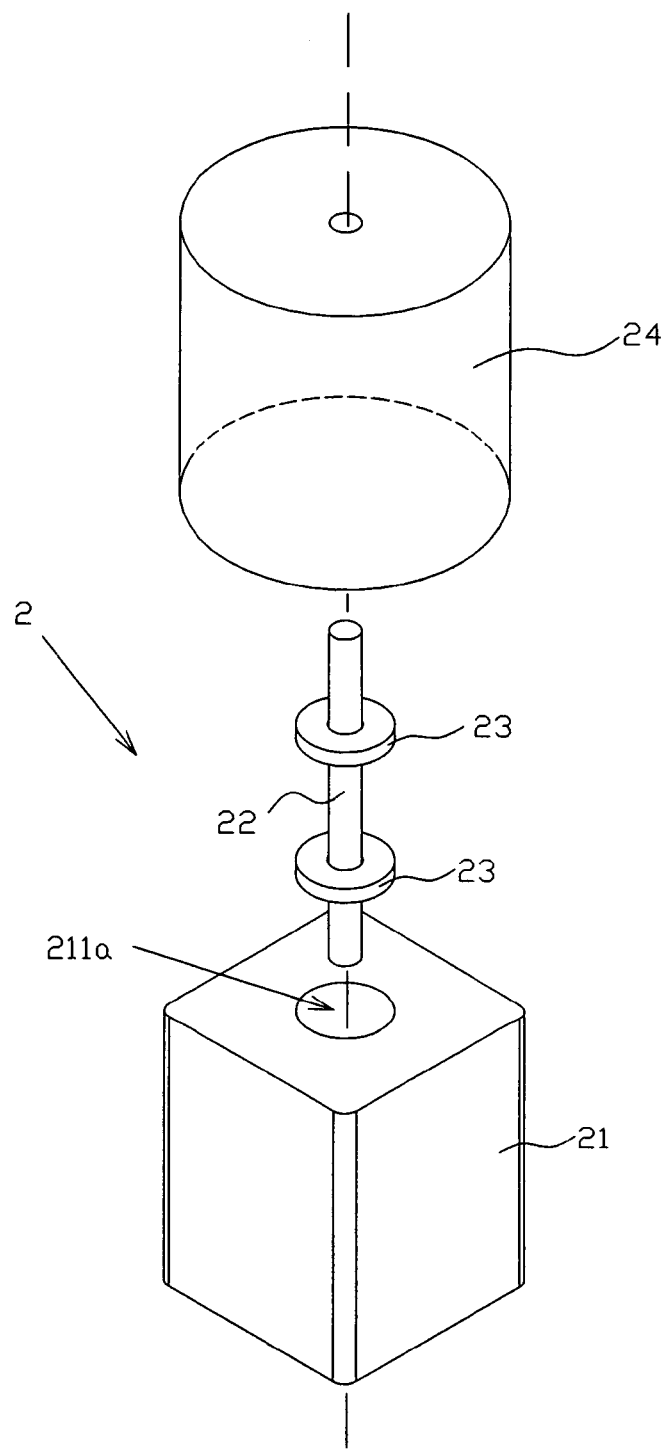
FIG. 2 is an exploded view of the rotary device according to the present invention.

Please refer to FIG. 2 which is a schematic diagram showing a preferred embodiment of the method for forming a rotary device of the present invention. The rotary device 2 includes a stator 21 and a rotor 24. The stator 21 has an upper opening 211a and a lower opening (not shown) for allowing the shaft 22 supported by two bearings 23 to pass therethrough such that the rotor 24 can be coupled to the stator 21 through the shaft 800 thereby constructing the rotary device, for instance, a motor. Moreover, the rotary device further includes a printed circuit board and a base. Because the assembly of these components is not the characteristic of the present invention, the detailed descriptions are omitted.

Figure 3A:
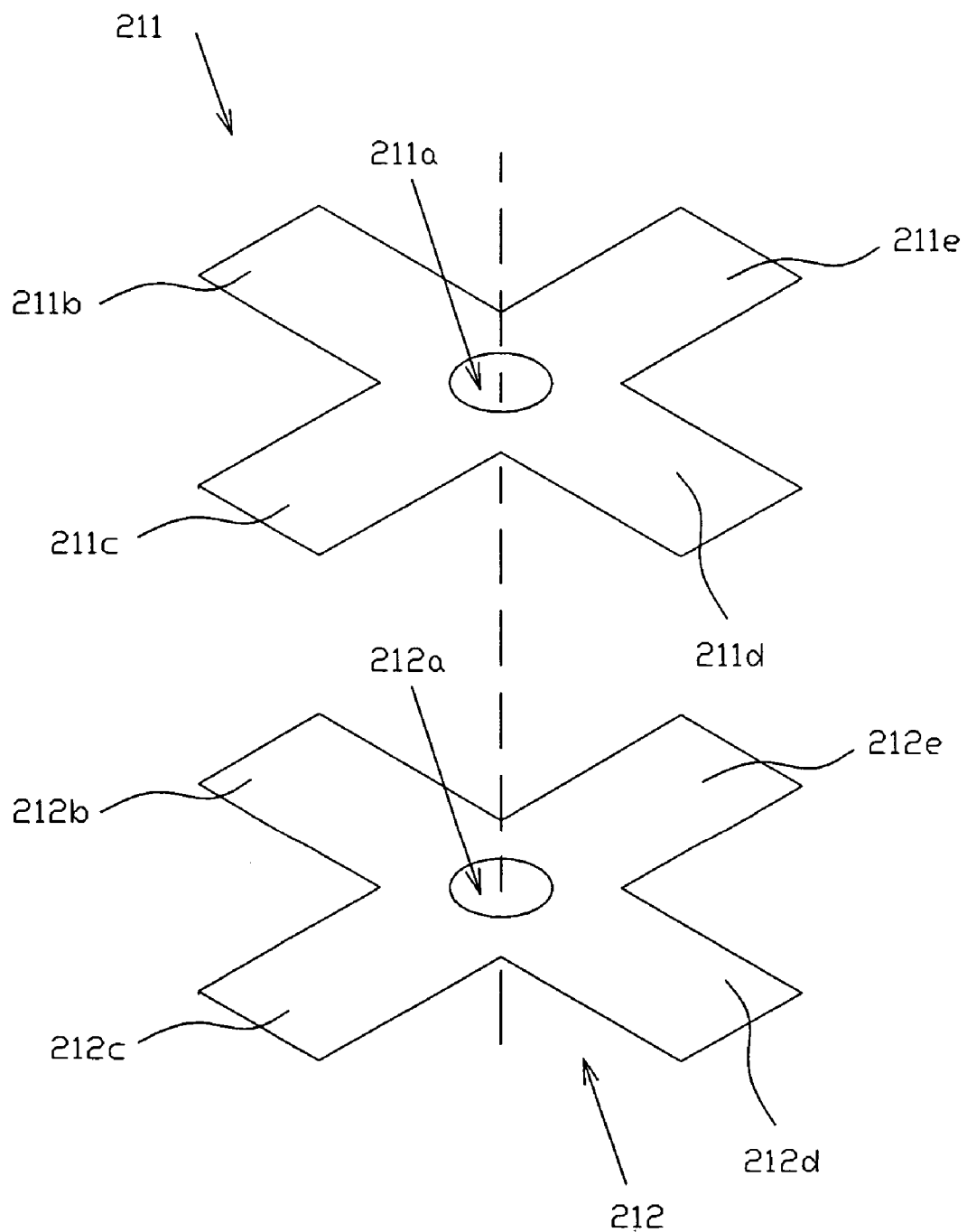
FIGS. 3A~3D are schematic diagrams showing the method for forming the first preferred embodiment of the stator structure according to the present invention.
Figure 3B:
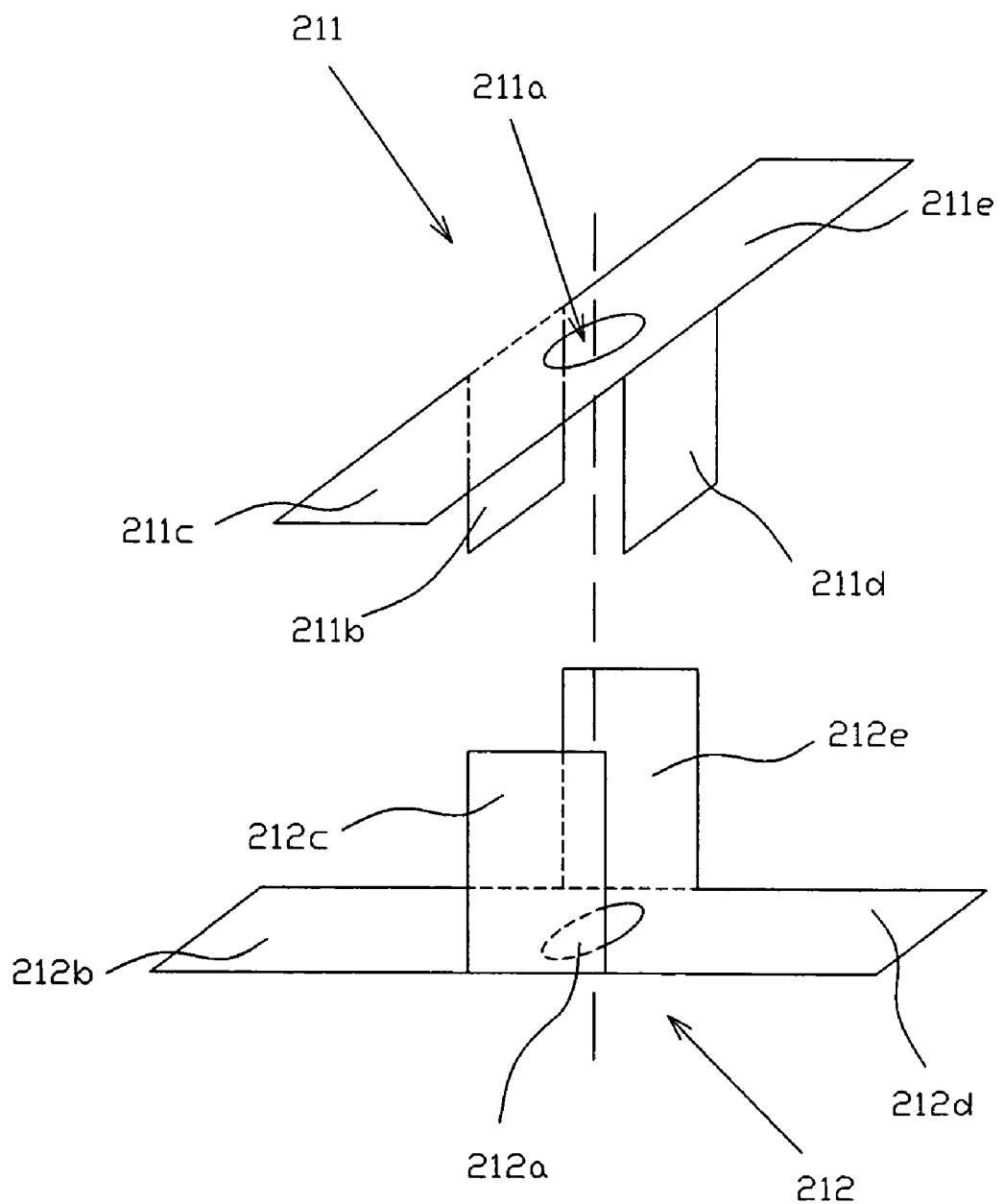
Figure 3C:
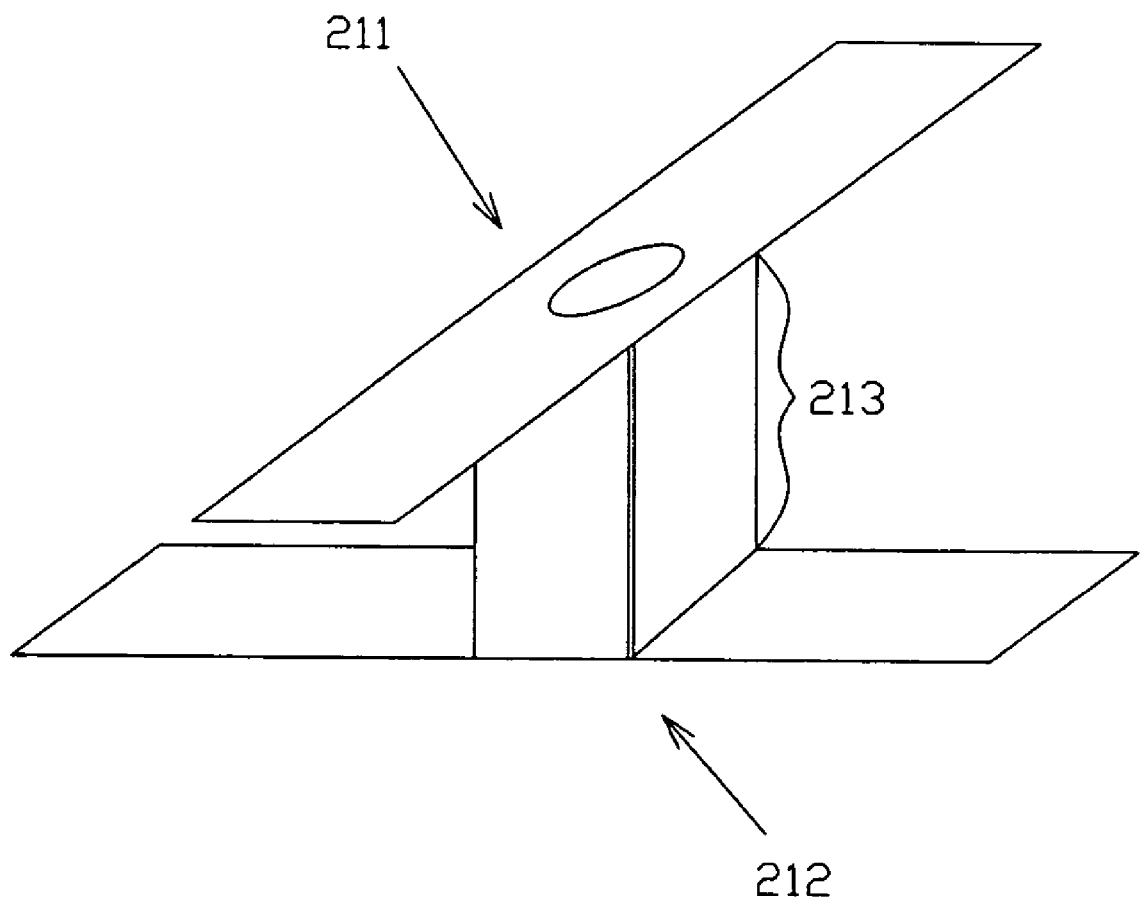
Figure 3D:
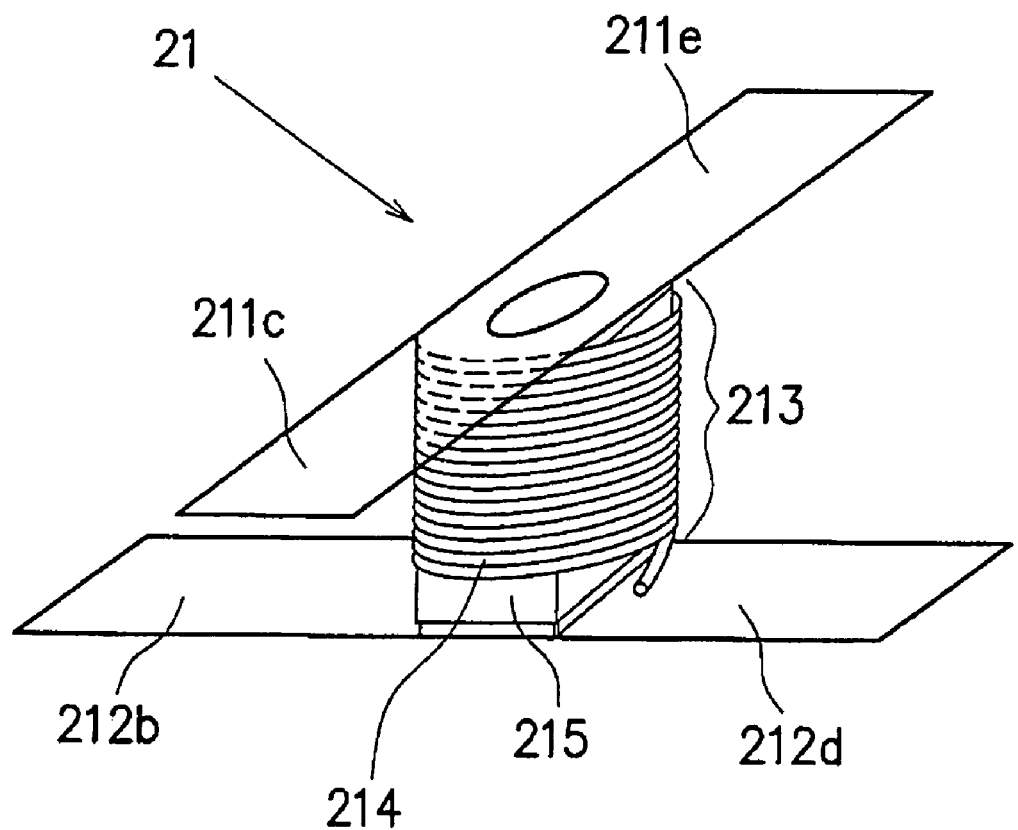

Please refer to FIGS. 3A~3D showing the method for forming the first preferred embodiment of a stator structure of the present invention. The stator structure can be integrally formed by a megnetically conductive material such as silicon steel and includes a first part 211 and a second part 212, both of which are cross-shaped structures, respectively. The first part 211 is a silicon steel sheet with a central opening 211a and four extending portions 211b~211e, each of which is a rectangular sheet radially extending out from the periphery of the central opening 211a. Likewise, the second part 212 is also a silicon steel sheet with a central opening 212a and four extending portions 212b~212e. The first and second parts constituted by the silicon steel sheets can be formed by metal punching, respectively. Two opposed extending portions 211b, 211d of the first part 211 are bent downwardly and two opposed extending portions 212c, 212e of the second part 212 are bent upwardly as shown in FIG. 3B. Then, the first and second parts are correspondingly combined together and the downwardly bent extending portions 211b, 211d of the first part 211 and the upwardly bent extending portions 212c, 213e of the second part 212 constitute the columnar portion 213 of the stator as shown in FIG. 3C, for winding the wire seathed with the insulating material thereon to form a coil 214 as shown in FIG. 3D (Now, this constructed structure is called a bobbin), while the unbent extending portions 211c, 211e of the first part 211 are kept in the first plane and the unbent extending portions 212b, 212d of the second part 212 are kept in the second plane. Before winding the wire on the columnar portion 213 of the stator, the columnar portion 213 of the stator is preferably wound with an insulating tape 215 (not shown). Finally, after winding the wire on the columnar portion 213 of the stator, the unbent extending portions 211c, 211e of the first 211 and unbent extending portions 212b, 212d of the second part 212 are bent toward the columnar portion 213, respectively, to wrap the coil 214 in the stator structure thereby forming the stator 21 shown in FIG. 2.

Figure 4:
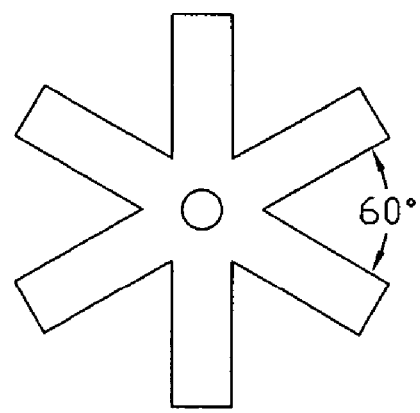
FIG. 4 is a schematic diagram showing the second preferred embodiment of the stator structure according to the present invention.
Figure 5:
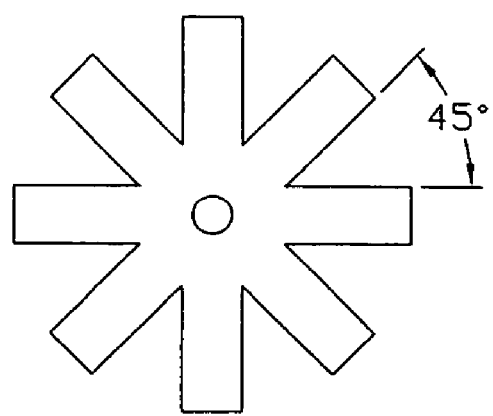
FIG. 5 is a schematic diagram showing the third preferred embodiment of the stator structure according to the present invention.

However, the number of the extending portions of the first and second parts is not only limited to four. The first part or the second part can have six extending portions which construct a hexagonal stellate structure as shown in FIG. 4 (the cross-angle of any two adjacent extending portion is 60°), or can have eight extending portions which construct a octagonal stellate structure as shown in FIG. 5 (the cross-angle of any two adjacent extending portion is 45°). In addition, it can be understood that the greater the number of the extending portions of the first part or the second part of the stator structure, the more the cross section of the formed columnar portion tends to a circle.

Figure 6:
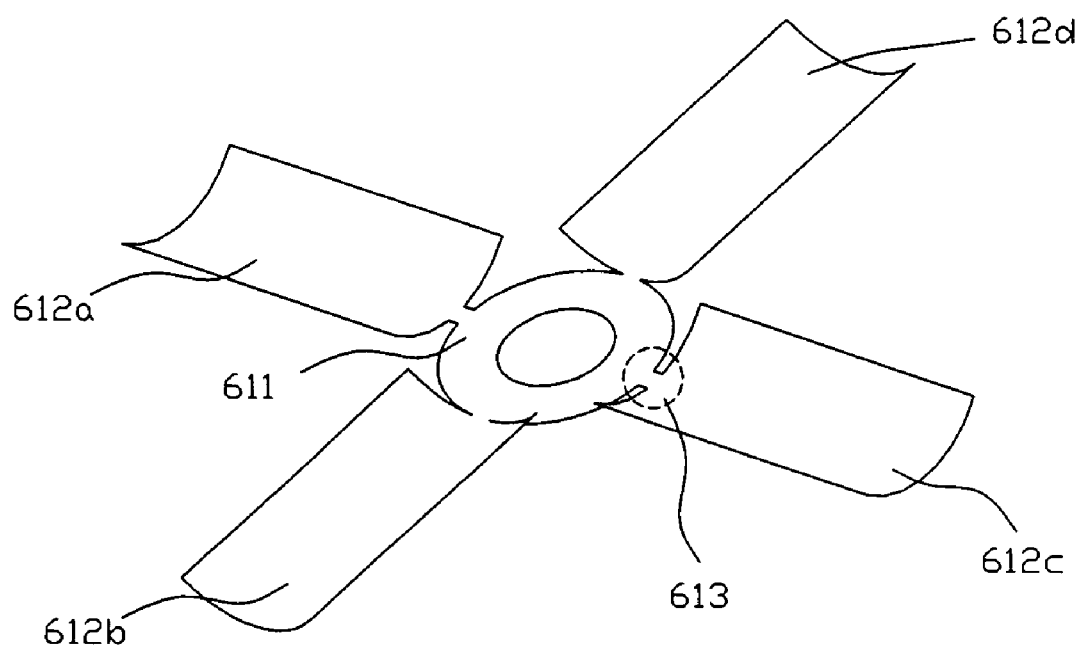
FIG. 6 is a schematic diagram showing the fourth preferred embodiment of the stator structure according to the present invention.

Alternatively, as shown in FIG. 6, each extending portion of the first part or the second part of the stator structur has a cross-sectionally arcuated shape so that the cross section of the columnar portion, formed after the extending portions of the first part or the second part are alternately bent upwardly or downwardly and the first and second parts are correspondingly assembled together, almost becomes a circle. In addition, as shown in FIG. 6, a narrowed connective portion 613 can be formed between each extending portion (612a, 612b, 612c, or 612d) of the first part or the second part and the central ring 611 for making the diameter of the columnar portion of the stator larger.

Figure 7:
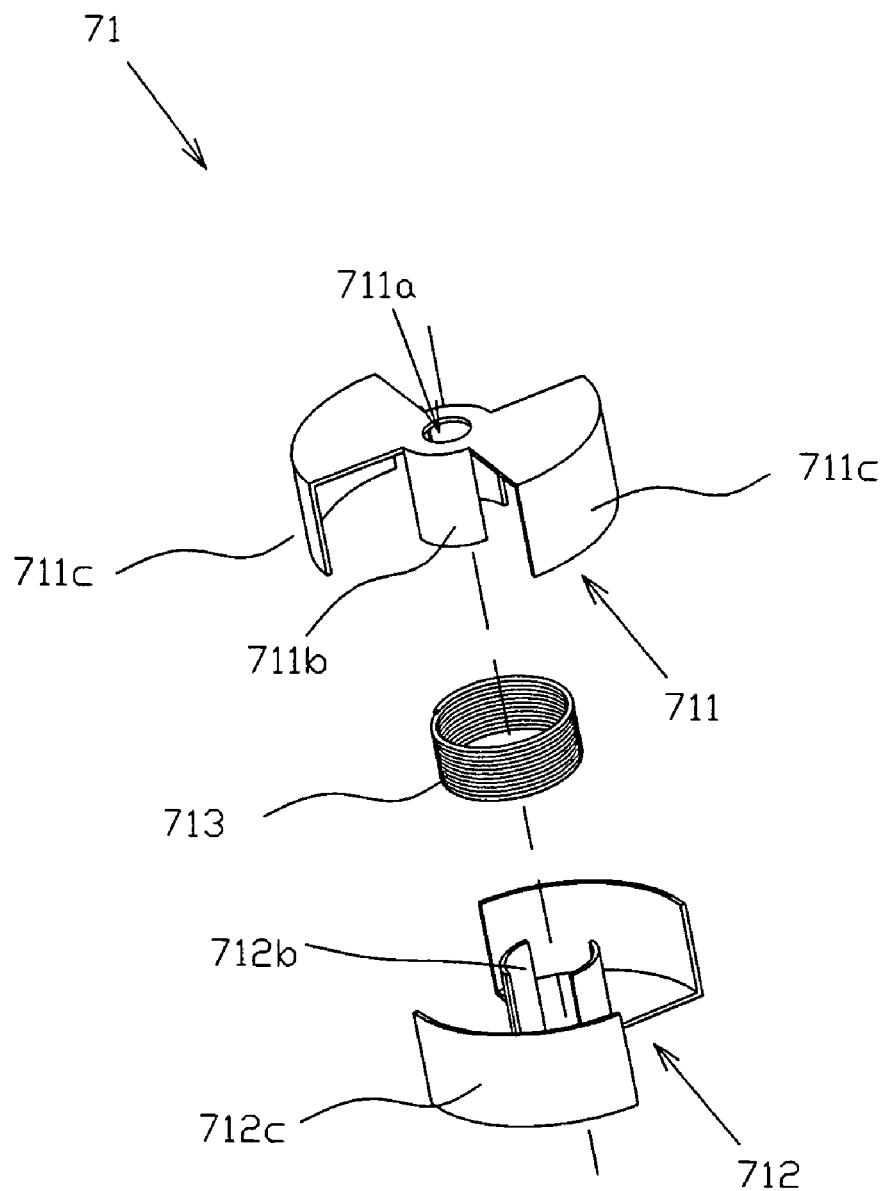
FIG. 7 is a schematic diagram showing the fifth preferred embodiment of the stator structure according to the present invention.

Additionally, the first part or the second part can also be formed as a structure shown in FIG. 7 by the cutting and punching processes. The first part 711 is completely identical to the second part 712 and each of them has a columnar portion 711b or 712b constituted by two bent and arcuated sheets, and two arcuated sidewall portions 711c or 712c. The first part 7111 has a ring 711a and the columnar portion 711b is used fro winding the coil thereon. The second part 712 also has the same structure as the first part 711. When the first part 711 and the second part 712 are correspondingly combined together, the coil 713 can be wrapped between the arcuated sidewall portions of the first and second parts and the columnar portions of the first and second parts to form a stator 71. The coil 713 is also sheathed with the insulating material and can be a self-adhesive coil.

Figure 8:
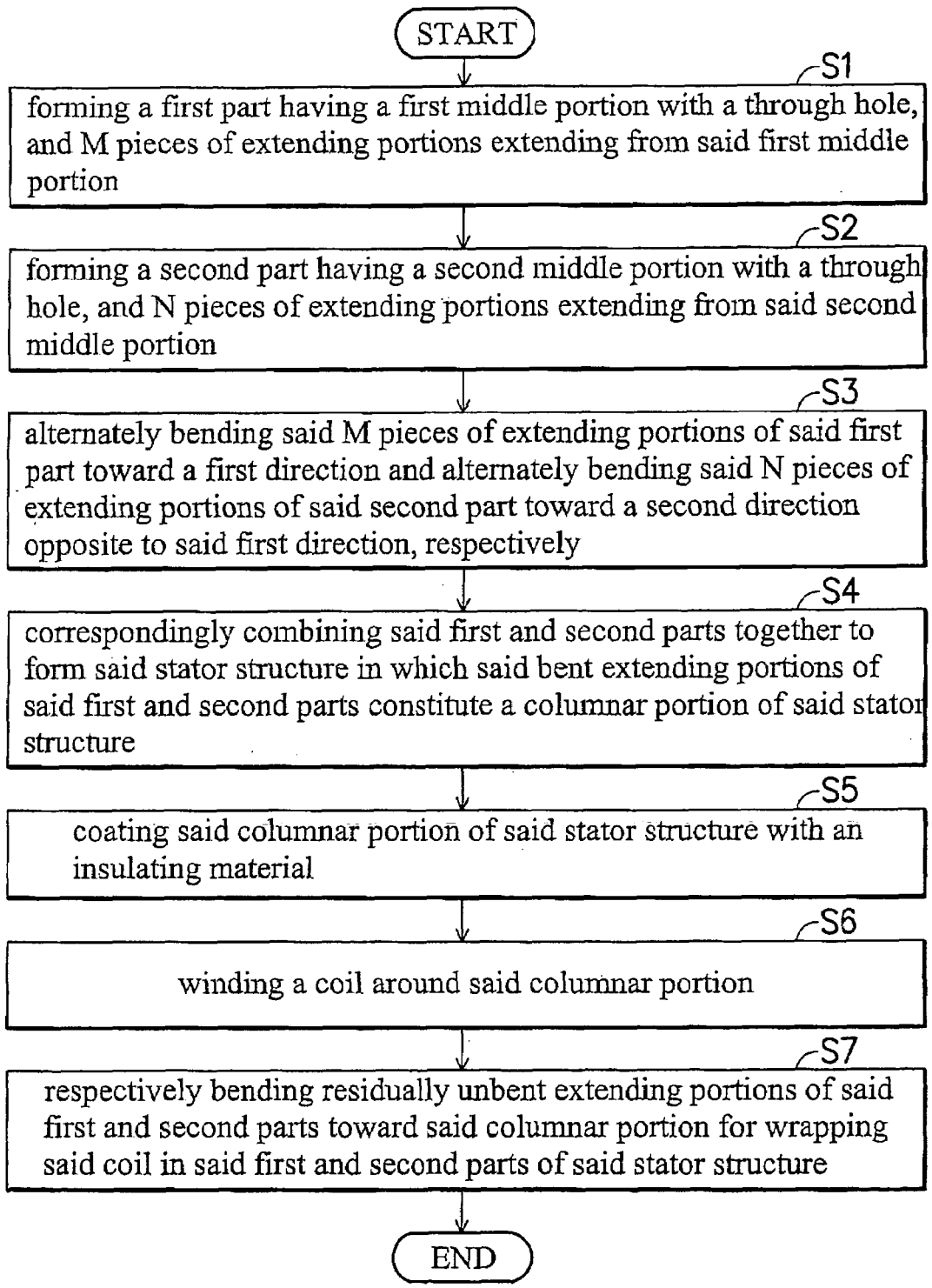
FIG. 8 is a flowchart showing the method for forming a stator structure according to the present invention.

FIG. 8 is a flowchart showing the method for forming a stator structure according to the present invention. First, as shown in FIG. 8, in the step S1, a first part having a first middle portion with a through hole, and M pieces of extending portions extending from the first middle portion is formed. In the step S2, a second part having a second middle portion with a through hole, and N pieces of extending portions extending from the second middle portion is formed. Additionally, M and N are even numbers not less than four, respectively. In the step S3, the M pieces of extending portions of the first part are alternately bent toward a first direction. Similarly, the N pieces of extending portions of the second part are alternately bent toward a second direction opposite to the first direction. In the step S4, the first and second parts are correspondingly combined together to form the stator structure in which the bent extending portions of the first and second parts constitute a columnar portion of the stator structure. Additionally, the tops of the bent extending portions of the first part extend to the same plane of the second middle portion, and the tops of the bent extending portions of the second part extend to the same plane of the first middle portion. In the step S5, the columnar portion of the stator structure is coated with an insulating material. In the step S6, a coil is wound around the columnar portion. Additionally, the insulating material prohibits the contact of the coil with the columnar portion. Finally, in the step S7, residually unbent extending portions of the first and second parts are respectively bent toward the columnar portion for wrapping the coil in the first and second parts of the stator structure.

In conclusion, the stator structure of the present invention is integrally formed by a magnetically conductive material (e.g. silicon steel) through a punching process Furthermore, it is unnecessary to fabricate the stator through a high-temperature potting process so that the surface of the stator structure will not be damaged. By improving the defects of conventional stator, the present invention provides a stator which can be easily fabricated for providing a motor with high yield rate and high operating efficiency.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for forming a stator structure comprising the steps of:
   (a) forming a first part having a first middle portion with a through hole, and M pieces of extending portions extending from said first middle portion;
   (b) forming a second part having a second middle portion with a through hole, and N pieces of extending portions extending from said second middle portion;
   (c) alternately bending said M pieces of extending portions of said first part toward a first direction and alternately bending said N pieces of extending portions of said second part toward a second direction opposite to said first direction, respectively;
   (d) correspondingly combining said first and second parts together to form said stator structure in which said bent extending portions of said first and second parts constitute an enclosed columnar portion of said stator structure; and
   (e) winding a coil around said enclosed columnar portion;
   wherein M and N are even numbers not less than four, respectively, and said bent extending portions of the first and second parts contact one another within the coil.

2. The method according to claim 1 wherein said first and second parts are integrally formed by a magnetically conductive material, respectively.

3. The method according to claim 2 wherein said magnetically conductive material is silicon steel.

4. The method according to claim 1 wherein each of said extending portions of said first and second parts is a rectangular sheet.

5. The method according to claim 1 wherein each of said extending portions of said first and second parts is an arcuated sheet.

6. The method according to claim 5 wherein said first middle portion of said first part is a ring which is connected with said each arcuated sheet of said first part through a narrowed connective portion, and said second middle portion of said second part is a ring which is connected with said each arcuated sheet of said second part through a narrowed connective portion.

7. The method according to claim 1 wherein after said step (d), said method further includes a step (f) of coating said enclosed columnar portion of said stator structure with an insulating material.

8. The method according to claim 7 wherein said insulating material is an insulating tape.

9. The method according to claim 7 wherein after said step (e), said method further includes a step (g) of respectively bending residually unbent extending portions of said first and second parts toward said enclosed columnar portion for wrapping said coil in said stator structure.

10. The method according to claim 1 wherein residually unbent extending portions of said first and second parts are arcuated sidewall structures such that said coil is wrapped in said stator structure by said arcuated sidewall structures of said first and second parts when said coil is wound on said enclosed columnar portion and said first and second parts are correspondingly combined together.

11. A method for forming a stator structure comprising the steps of:
    (a) forming a first part having a first middle portion with a through hole, and M pieces of extending portions extending from said first middle portion;
    (b) forming a second part having a second middle portion with a through hole, and N pieces of extending portions extending from said second middle portion;
    (c) alternately bending said M pieces of extending portions of said first part toward a first direction and alternately bending said N pieces of extending portions of said second part toward a second direction opposite to said first direction, respectively;
    (d) correspondingly combining said first and second parts together to form said stator structure in which said bent extending portions of said first and second parts constitute a columnar portion of said stator structure, wherein the tops of the bent extending portions of the first part extend to the same plane of the second middle portion, and the tops of the bent extending portions of the second part extend to the same plane of the first middle portion;
    (e) coating said columnar portion of said stator structure with an insulating material;
    (f) winding a coil around said columnar portion, wherein said insulating material prohibits the contact of said coil with said columnar portion; and
    (g) respectively bending residually unbent extending portions of said first and second parts toward said columnar portion for wrapping said coil in said first and second parts of said stator structure;
    wherein M and N are even numbers not less than four, respectively.

* * * * *